(12) United States Patent
Gerson (10) Patent No.: US 11,542,044 B2
(45) Date of Patent: Jan. 3, 2023

(54) SYSTEMS AND METHODS FOR CENTRIFUGAL FORCE-BASED CANISTER FILLING

(71) Applicant: Louis M. Gerson Co., Middleboro, MA (US)

(72) Inventor: Ronald L. Gerson, Middleboro, MA (US)

(73) Assignee: Louis M. Gerson Co., Middleboro, MA (US)

( * ) Notice: Subject to any disclaimer, the term of this patent is extended or adjusted under 35 U.S.C. 154(b) by 0 days.

(21) Appl. No.: 17/617,349

(22) PCT Filed: Jun. 10, 2020

(86) PCT No.: PCT/US2020/036971
§ 371 (c)(1),
(2) Date: Dec. 8, 2021

(87) PCT Pub. No.: WO2020/252004
PCT Pub. Date: Dec. 17, 2020

(65) Prior Publication Data
US 2022/0250775 A1    Aug. 11, 2022

Related U.S. Application Data

(60) Provisional application No. 62/860,067, filed on Jun. 11, 2019.

(51) Int. Cl.
*B65B 1/14* (2006.01)
*B01D 39/06* (2006.01)
(Continued)

(52) U.S. Cl.
CPC .............. *B65B 1/14* (2013.01); *B01D 39/06* (2013.01); *B01D 46/0001* (2013.01); *B65B 1/20* (2013.01);
(Continued)

(58) Field of Classification Search
CPC .... B65B 1/04; B65B 1/10; B65B 1/14; B65B 1/20; B65B 35/14; B65B 43/62;
(Continued)

(56) References Cited

U.S. PATENT DOCUMENTS 5,240,049 A * 8/1993 Chiari ............... A61J 3/074
141/81
6,056,025 A 5/2000 Wegman
(Continued)

FOREIGN PATENT DOCUMENTS

CN   103415326 A   11/2013
GB    1438578 A    6/1976

OTHER PUBLICATIONS

International Search Report, PCT Application No. PCT/US2020/036971, dated Sep. 4, 2020 (2 pages).
(Continued)

*Primary Examiner* — Nicolas A Arnett
(74) *Attorney, Agent, or Firm* — Occhiuti & Rohlicek LLP (57) ABSTRACT

Disclosed are methods, systems, canisters, and other implementations, including a method of filling a filter canister with a particulate filter material to a desired packing density comprises providing a canister having a fill opening through which the particulate filter material is introduced into the canister, introducing the particulate filter material through the fill opening, and subjecting the canister to centrifugal forces for a time until the desired packing density is reached is provided.

18 Claims, 4 Drawing Sheets

(51) Int. Cl.
  *B01D 46/00*   (2022.01)
  *B65B 1/20*   (2006.01)
  *B65B 35/14*   (2006.01)
  *B65B 43/62*   (2006.01)
  *A62B 19/00*   (2006.01)
  *B01D 39/04*   (2006.01)
  *B01D 39/08*   (2006.01)
(52) U.S. Cl.
  CPC .............. *B65B 35/14* (2013.01); *B65B 43/62* (2013.01); *A62B 19/00* (2013.01); *B01D 39/04* (2013.01); *B01D 39/08* (2013.01); *B01D 2239/0618* (2013.01)
(58) Field of Classification Search
  CPC ........ B01D 39/04; B01D 39/06; B01D 39/08; B01D 46/0001; B01D 2239/0618; A62B 19/00
  See application file for complete search history.

(56) References Cited

U.S. PATENT DOCUMENTS

| | | | | |
|---|---|---|---|---|
| 7,331,364 | B2* | 2/2008 | Schlacchter | B01D 39/2058 141/71 |
| 2004/0108281 | A1* | 6/2004 | Gerteis | B04B 3/02 210/781 |
| 2013/0292001 | A1* | 11/2013 | Scott | A62B 19/00 141/12 |
| 2015/0266003 | A1* | 9/2015 | Littleton | B01J 20/3092 502/5 |
| 2021/0316889 | A1* | 10/2021 | Marcelloni | A61J 7/0046 |

OTHER PUBLICATIONS

Written Opinion of the International Search Authority, PCT Application No. PCT/US2020/036971, dated Sep. 4, 2020 (9 pages).

* cited by examiner

SYSTEMS AND METHODS FOR CENTRIFUGAL FORCE-BASED CANISTER FILLING

CROSS-REFERENCE TO RELATED APPLICATIONS

This application is the National Stage of International Application No. PCT/US2020/036971, filed Jun. 10, 2020, which claims the benefit of U.S. Provisional Application No. 62/860,067, filed Jun. 11, 2019, the contents of which are incorporated herein by reference.

BACKGROUND

This disclosure relates to the filling of a ventilation respirator canister with particulate filter material.

Respirators are used to remove hazardous particles or vapors from the air, and are typically used in situations such as construction or chemical cleanup where those hazardous materials can be found in high concentrations. Due to the potential dangers of inhaling hazardous particles or vapors, it is important that a properly functioning ventilation device (respirator) be used when operating in such hazardous environments. One way to improve the effectiveness of filter canisters for use in ventilation respirators is to pack the filter material—for example, an activated carbon—to a density that is as effective at filtering out toxins or particles as possible, without restricting the breathing of the user.

SUMMARY

In a general aspect of the invention, a method of filling a filter canister with a particulate filter material to a desired packing density comprises providing a canister having a fill opening through which the particulate filter material is introduced into the canister, introducing the particulate filter material through the fill opening, and subjecting the canister to centrifugal forces for a time until the desired packing density is reached is provided.

Embodiments of this aspect of the invention may include one or more of the following features. Prior to subjecting the canister to centrifugal forces, positioning the canister in a horizontal or a vertical position. During subjecting the canister to centrifugal forces, the canister is moved from the horizontal position to the vertical position, for example, repeatedly. The introducing and subjecting steps can take place sequentially or simultaneously.

The particulate filter material is selected from a group of activated charcoals, zeolites, molecular sieves and alumina. The particulate material may be an adsorbent. the particulate material may be mixed with heterophil fibers.

The subjecting step may be performed in multiple horizontal directions, in at least two mutually orthogonal directions or sequentially in at least two mutually orthogonal directions.

The filter canister has a curved peripheral outer wall and the fill opening is in the peripheral outer wall. The outer wall of the filter canister is elliptically shaped while the peripheral outer wall defines an irregular shape. The canister is further defined by an outlet wall that is concave to conform to the curvature of the face of the user. The canister is further defined by an inlet wall that is convex, and the inlet wall and the outlet wall are spaced from each other and joined by the peripheral outer wall.

In another general aspect of the invention, a canister filling system comprises a reservoir containing particulate filter material, a retractable application pipe coupled to the reservoir and configured to transfer the particulate filter material from an end of the application pipe coupled to the reservoir to another end of the application pipe, and a rotation system to hold a filter canister with a fill opening couplable to the other end of the application pipe, the rotation system configured to rotate the filter canister so as to generate centrifugal forces applied to the filter canister for a period of time until a desired packing density of the particulate material, introducible into the filter canister through the fill opening, is reached.

Embodiments of this aspect of the invention may include one or more of the following features. The reservoir comprises a hopper with an inwardly tapered end section defining a hopper outlet opening coupled to the retractable application pipe.

The rotation system comprises a rotating platform. The rotation system comprises the retractable application pipe coupled to a rotation mechanism configured to actuate the retractable application pipe to cause the retractable application pipe to rotate. The retractable application pipe is configured to lock into the filter canister during rotation of the retractable application pipe. The rotation system comprises a rotating disk securable to the filter canister. The rotation system comprises a rotating holding mechanism configured to hold the canister and displace the canister in multiple directions.

The canister filling system further comprises a controllable motor to controllably cause retraction or extension of the retractable application pipe and the motor may be controlled by a controller to determine the retraction or extension of the retractable application pipe based on data produced by the rotation system. The data comprises measured angular velocity of the rotation system.

The particulate filter material is selected from a group of activated charcoals, zeolites, molecular sieves and alumina. The particulate material may be an adsorbent. the particulate material may be mixed with heterophil fibers.

The system may further comprise a valve placed inside the retractable application pipe to control flow of the particulate material introducible into the filter canister as well as a controller to controllably actuate opening position of the valve.

In still another general aspect of the invention a canister comprises a canister body defining an inner cavity containing particulate filter material and a fill opening defined in an outer surface of the body of the canister to receive a retractable application pipe controllably introducing the particulate filter material from a reservoir, the canister being configured to be controllably rotated so that resultant centrifugal forces applied to the canister cause the particulate filter material to be controllably distributed within the inner cavity at a desired density during a period of time.

Other features and advantages of the invention are apparent from the following description, and from the claims.

DESCRIPTION OF DRAWINGS

FIG. 4b is a cross-sectional view of the canister depicted in FIG. 4a.

Like reference symbols in the various drawings indicate like elements.

DESCRIPTION

Disclosed herein are systems, methods, devices, canisters, and other implementations to pack filter canisters with particulate filter material at varying densities. In some embodiments, a method of filling a filter canister with a particulate filter material to a desired packing density is provided that includes providing a canister having a fill opening through which the particulate filter material is introduced into the canister, introducing the particulate filter material through the fill opening, and subjecting the canister to centrifugal forces for a time until the desired packing density is reached. In some embodiments, subjecting the canister to the centrifugal forces is performed in at least two mutually orthogonal directions. For example, the canister may initially be placed in a horizontal position (e.g., relative to the canister's main axis), which may be one of multiple possible horizontal orientations for the canister, and rotated to cause particulate material introduced by an application pipe to be distributed in the canister through centrifugal forces. Subsequently the canister can be moved to a vertical position where it is again rotated to cause the particulate material to be distributed towards the canister's walls.

In some embodiments, a canister filling system is provided that includes a reservoir (e.g., a hopper with a tapered end) containing particulate filter material, and a retractable application pipe (whose retractable position may be controlled by a controller, e.g., a processor-based controller) coupled to the reservoir and configured to transfer the particulate filter material from an end of the application pipe coupled to the reservoir to another end of the application pipe. The system further includes a rotation system to hold a filter canister with a fill opening couplable to the other end of the application pipe, with the rotation system configured to rotate the filter canister so as to generate centrifugal forces applied to the filter canister for a period of time until a desired packing density of the particulate material is reached. In some embodiments, the rotation system may include a rotating platform on which the canister is placed, so that when platform rotates, the canister will likewise be rotated. In some embodiments, the rotation system may include the retractable application pipe coupled to a rotation mechanism (e.g., actuated by a motor) configured to actuate the retractable application pipe to cause the retractable application pipe to rotate.

Figure 1:
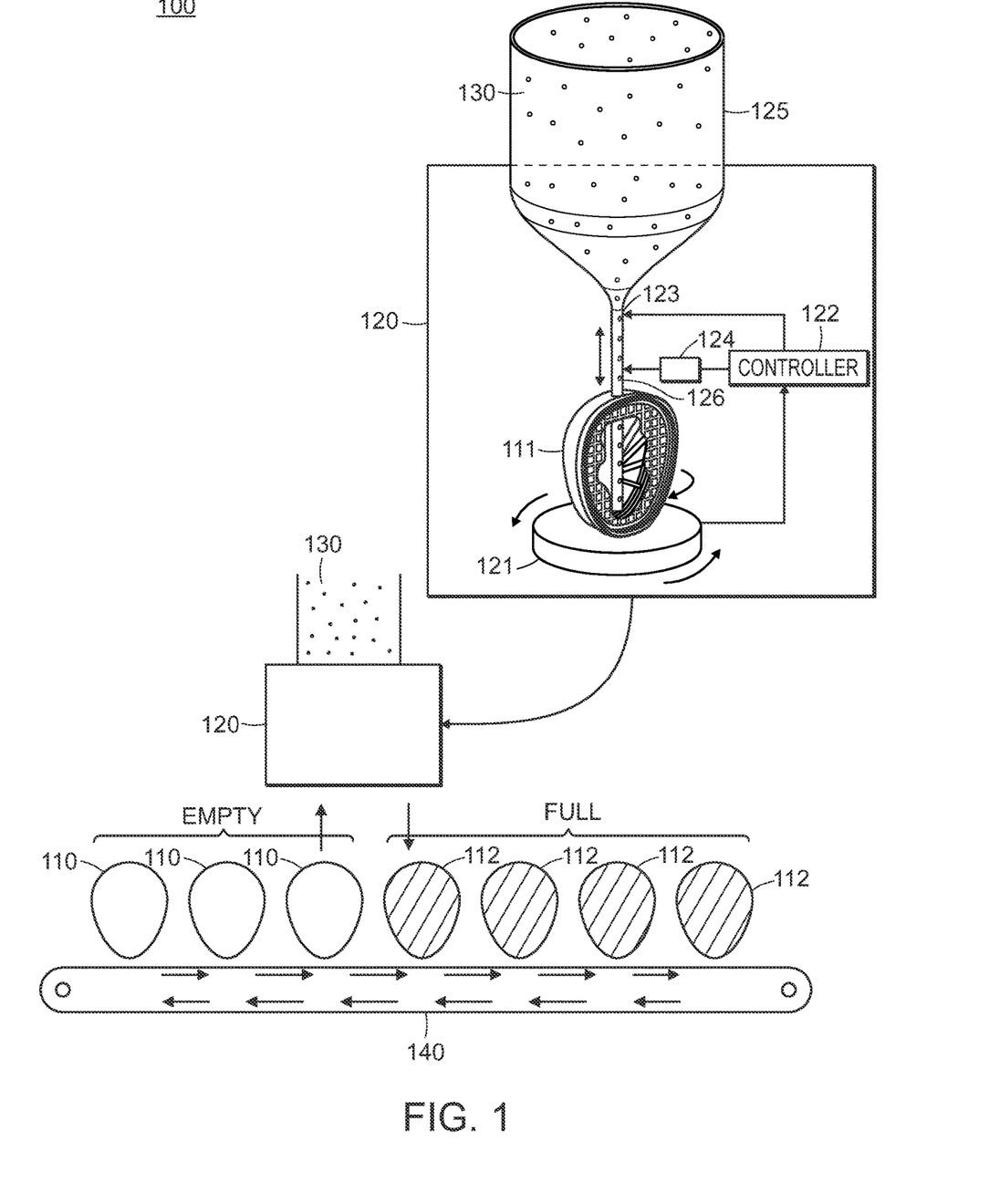
FIG. 1 is a diagram of an example system to fill respirator canisters with particulate filter material.

Thus, referring to FIG. 1, a diagram of an example canister filling system 100 is shown. The system 100 is configured to fill filter canisters with a particulate filter material 130, such as particulate materials selected from a group of activated charcoals, zeolites, molecular sieves and alumina, to a desired packing density. In some embodiments, the particulate material may be an adsorbent. In some embodiments, the particulate material may be mixed with heterophil fibers. As illustrated in FIG. 1, the system 100 includes a filler 120, which receives empty cartridges 110, and fills them with the filter material 130 to yield filled cartridges 112. For example, the cartridges may pass in an assembly line 140 (e.g., comprising a conveyer belt), and each unfilled cartridge 110 is filled in turn by the filler 120.

In some embodiments, the filler 120 operates by dropping the filter material 130 from a reservoir 125 (e.g., a hopper with an inwardly tapered end section defining a reservoir outlet opening) through a fill opening (illustrated in FIG. 2) in a cartridge/canister 111 being filled. As described further below, the canister 111 is subjected to centrifugal forces for a period of time until the desired packing density is reached (as may be measured, or may be inferred or computed based on experimentations to determine densities reached for different time periods during which a canister is being filled with particulate material and subjected to centrifugal forces). In other embodiments, the canister 111 may be placed and filled in a horizontal manner rather than vertically, and may be otherwise manipulated or actuated to be displaced in different directions during the filling process.

Further referring to FIG. 1, an unfilled cartridge/canister 110 is provided into the filler 120, where it is filled with the particulate material 130. More specifically, the canister 111 may be held (e.g., placed, grasped, or received) by a rotation system configured to rotate the canister 111 so as to generate centrifugal forces applied to the canister for a period of time until a desired packing density of the particulate material 130 introduced into the interior of the canister is reached. In some embodiments, and as illustrated in FIG. 1, the rotation system may include a rotating holder (e.g., turn table) 121, causing the canister 111 to be rotated at a fixed or varying speed throughout the filling process. Information about the rotational speed of the rotating disk 121 (and therefore, rotational speed of the canister 111) is given to a controller 122 (e.g., a processor-based controller, a state-machine controller, or any other type of controller). In some embodiments, the rotational speed may be measured through a motion sensor (e.g., a gyroscope, accelerometer, etc.) positioned within the canister or the rotation system. In some embodiments, the controller 122 may also use this information to controllably actuate an opening position (e.g., to open and close) for a valve 123, and/or to controllably change a position of an end opening of an application pipe 126 introduced into the canister 111.

The application pipe 126 is the passage through which the particulate material 130 in provided from the reservoir 125 down to the canister 111. Additionally, the valve 123 is the interface between the application pipe 126 and the filler reservoir 125. In some embodiments, the application pipe 126 may be a telescopic pipe, allowing it to be extended and retracted along its axis so that the position of the end of the pipe inside the canister can be controlled. As previously mentioned, the extent to which the application pipe 126 is extended or retracted may be determined by the controller 122, which in turn drives an actuator 124 to perform the actual adjustment of the length of the application pipe 126 and/or to control the opening of the valve 123. Thus, through controlled shifting of the position of the end of the application pipe and the actuation of the valve 123, the placement position and rate of deposit of the particulate filter materials 130 within the interior of the canister can be controlled to facilitate, in conjunction with the application of centrifugal forces to the canister being filled, achieving the desired density of the particulate filter material in the canister 111.

An objective of rotating the canister 111 is to achieve a packing density of the filter material 130 that is greater than that which would otherwise be achieved, for example, through alternative packing methods. This increased packing density is achieved by subjecting the filter material 130 inside the canister 111 to centrifugal forces that push the filter material 130 towards the outside walls of the canister 111. In accordance with the way the centrifugal force acts upon the filter material 130, the shape of the walls of canister 111 are made to be rounded in shape. This is done such that a pack of uniform density is achieved relative to a pack that would be achieved in a canister with walls of a different shape (i.e., a canister with angular walls). As also noted, in addition to achieving a dense packing of filter material through rotating the canister 111, dense packing is also achieved in part by gradually retracting the application pipe 126 as the filling process progresses. This is done so that the space occupied in the canister 111 by the application pipe 126 can ultimately be filled by more filter material 130. The application pipe 126 is retracted as the canister 111 is filled so as to make room for more filter material 130. As the application pipe 126 is retracted while more filter material 130 is added to the canister 111, the process of rotating the canister 111 may continue, so as to maximize packing density of the filter material 130 as more material is added. Once the canister 111 is sufficiently packed, the application pipe 126 is fully removed from the canister 111, and the canister is moved away from the filler 120 back onto the assembly line 140, to be carried away (with other already filled canisters) from the filler 120.

In some embodiments, the process of filling and rotating the canister 111 (in order to subject it to centrifugal forces that cause distribution of the particulate materials in a way that achieved some desired density) can be performed such that the canister 111 being filled is positioned in a horizontal direction (e.g., relative to a main axis of the canister 111). In some embodiments, the canister 111 may be moved in such a way that the orientation of its main axis (e.g., relative to some fixed frame of reference) changes as the canister 111 is being filled. For example, the canister 111 may initially be rotated while its main axis is in a vertical orientation. Subsequently, the canister 111 may be moved (e.g., by a holding/grasping mechanism, not shown in FIG. 1) so that its main axis is in a different orientation (e.g., horizontal), and then rotated to facilitate the distribution of the particulate material 130. In some embodiments, the application pipe 126 may remain within the interior of the canister 111 as the orientation of the canister 111 is changes, while in some embodiments, it may be necessary to retract the application pipe 126 from the interior of the canister 111 before the orientation of the canister 111 is changed. In some embodiments, the rotation/spinning process and the filter material filling process may take place sequentially rather than simultaneously.

In further embodiments, instead of using the rotating holder 121 to implement the rotation system that causes the rotation (and thus application of centrifugal forces) to the canister 111, the retractable application pipe 126 may also be configured to cause the rotation action. Thus, in such embodiments, the retractable application pipe may be configured to lock into the canister 111, such that the locking prevents the retractable application pipe 126 from becoming decoupled from a canister during the filling process. A rotation mechanism (e.g., comprising a motor, controlled, for example by the controller 122, and a mechanical interface to mechanically couple the motor to the retractable application pipe 126) may be used to impart rotation motion to the retractable application pipe 126 to cause the pipe 126 to rotate about its main axis. In such embodiments, with the retractable application pipe locked into the canister 111 (at, for example, an area near the opening of the canister 111 that receives the pipe 126), rotation of the retractable application pipe will cause rotation of the canister 111. During the time that the pipe 126 is rotating, it may nevertheless continue to introduce the particulate material 130 into the interior of the canister 111, and may be controllably retracted within the canister's interior. One advantage of embodiments in which the retractable application pipe 126 is also used to rotate the canister 111 is that the retractable application pipe does not have to rely upon another device, such as a rotating platform (like the rotation holder 121), to keep from decoupling from the canister 111 during the filling process. Other types and implementations of the rotation system for causing rotation of the canister 111 may be used.

Figure 2:
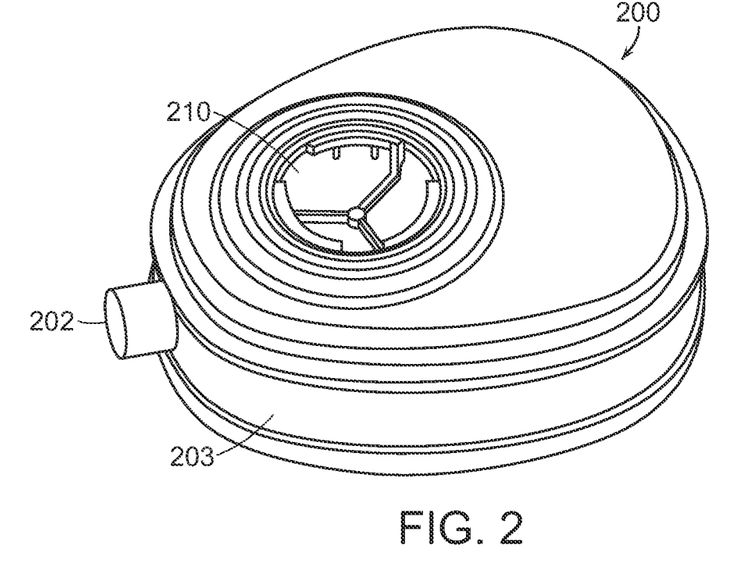
FIG. 2 is a bottom view of an example canister configured to be filled by application of centrifugal forces.
Figure 3:
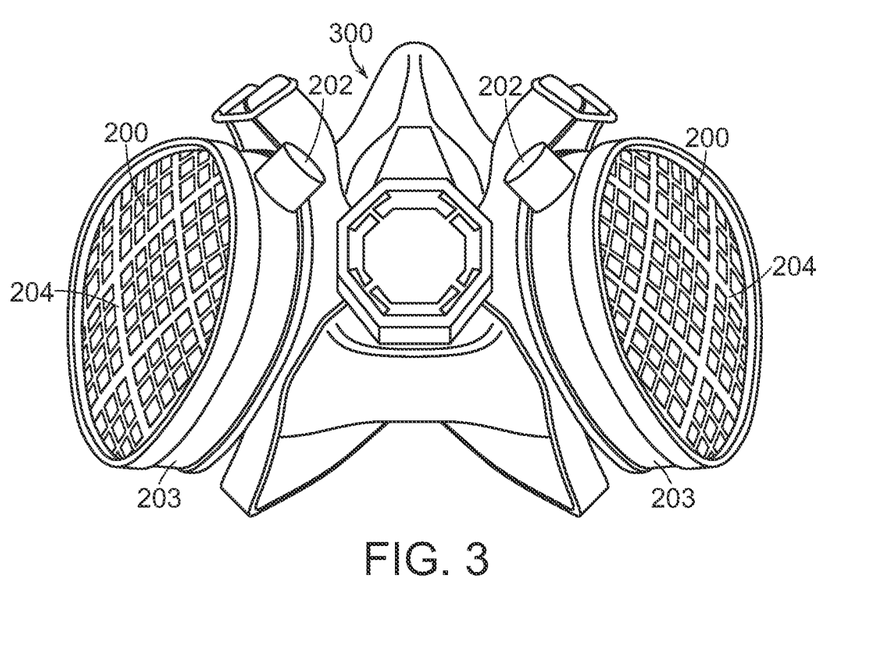
FIG. 3 is a diagram of an example mask connected to two canisters such as the one depicted in FIG. 2.

Referring next to FIG. 2, a front view diagram of an example filter canister 200, which may be similar to any of the canisters (110, 111, and 112) depicted in FIG. 1, is shown. The canister 200 includes a canister body 203 defining an inner cavity 201 (where inner cavity 201 is the empty space within the canister body 203). Canister body 203 is shown to include a fill opening 202 at its top, where the top of canister 200 is the location on the canister body 203 where an application pipe, such as the retractable application pipe 126 of FIG. 1, can be inserted, so as to fill the inner cavity 201 with particulate filter material. As can be seen in FIG. 3, a lattice 204 defining vents through which filter air can be passed to a mask (containing an interface to which the canister 200 can be mechanically coupled) is placed across the front of the filter canister 200.

Further referring to FIG. 2, particulate filter material (not shown in FIG. 2) such as particulate materials selected from a group of activated charcoals, zeolites, molecular sieves and alumina, are contained within the inner cavity 201 defined by the canister body 203. In some embodiments, the particulate material may be an adsorbent material. In some embodiments, the particulate material may be mixed with heterophil fibers. The particulate filter material is further contained within a filter media retaining structure (not shown in FIG. 2) such as a mesh bag or container. In practice, the filter media retaining structure can be made of other materials that do not inhibit air flow through the canister 200, and is typically constructed to be a non-woven web of material.

The shape of the canister body 203 may be made, in some embodiments, to be curved. The purpose of the curvature of the canister body 203 is such that when centrifugal force is exerted on the canister 200, the particulate filter material may be packed more efficiently than if the canister body 203 were to have an angular shape. It is noted that one can take advantage of the curvature of the canister body 203 when imparting centrifugal force if centrifugal force is exerted on the canister 200 by rotating it about a vertical axis created by a retractable application pipe (such as the retractable pipe 126 of FIG. 1) inserted at the fill opening 202.

In some embodiments, the curvature of the canister body 203 can be implemented such that the filter canister 200 has a curved peripheral outer wall, and the fill opening 202 is in the peripheral outer wall. The overall shape of the canister body 203 may be elliptical, as a result of the outer wall of the filter canister 200 being elliptically shaped. In such an embodiment, the fill opening 202 is to be placed on top of the elliptically-shaped peripheral outer wall, where "top" in this context refers to a location on the peripheral outer wall that is directly in line with the major axis of the ellipse created by the curvature of the outer wall of the filter canister 200. Alternatively, rather than being elliptically shaped, the peripheral outer wall may define an irregular shape. Generally, the peripheral outer wall may define any shape.

In some embodiments, the fill opening 202 may be structured such that it can become coupled to a retractable application pipe and/or locked thereto. The pipe can then be rotated to transfer rotational force to the canister locked to the pipe. Different mechanical structures to lock the retractable application pipe into the canister 200 may be used. Thus, advantageously, use of a mechanical locking mechanism may facilitate the retractable application pipe being used as a source of centrifugal force to apply to the canister 200. This would be accomplished by coupling the retractable application pipe to the canister 200, and proceeding to rotate the retractable application pipe; as the pipe and the canister 200 are coupled, the rotation of the pipe would also rotate the canister. Alternatively, locking of the pipe into the canister may be achieved via electrical or magnetic locking mechanisms.

Thus, in some embodiments, a canister (such as the canister 200) is provided that includes a canister body defining an inner cavity containing particulate filter material, and a fill opening defined in an outer surface of the body of the canister to receive a retractable application pipe controllably introducing the particulate filter material from a reservoir. The canister is configured to be controllably rotated so that resultant centrifugal forces applied to the canister cause the particulate filter material to be controllably distributed within the inner cavity at a desired density during a period of time. In some embodiments, the canister including the canister body defining an inner cavity can be structured such that the canister is further defined by a concave outlet wall coupled to a convex inlet wall, where the coupling is accomplished by the inlet wall and the outlet wall being spaced from each other and joined by the peripheral outer wall. The canister may be defined in such a way so that the concave curvature of the outlet wall conforms to the curvature of the face of a user, when the canister is coupled to a respiratory mask.

As noted, the canister, once filled with particulate materials (at an achieved desired density) can be fitted to a respirator mask. More particularly, FIG. 3 shows an example embodiment of a bottom view of a canister such as the canister 200 (whose top view is depicted in FIG. 2). It should be noted that the term "bottom" is used herein to represent the side of a component that faces a mask. In a corresponding manner, the term "top" is used herein to represent the side of a component that faces a particle filter, when used. The bottom of the canister 200 may include a female connector 210 for connecting to a male inhalation port of a mask 300 (shown in FIG. 3). As a result, the air drawn in during an inhalation by a user passes through media held within the body of the canister 200, thereby protecting the user from ambient vapors. As an example, FIG. 3 shows the mask 300 with two canisters 200 removably connected to the mask's inhalation ports. In order to increase airflow through the adsorbent media, internal ridges may project inwardly from the interior surface of the bottom side of vapor filter to promote distribution of the inhaled air over the entire surface area of the canister 200. The ridges may also apply pressure to the retaining fabric, thereby compacting the adsorbent media to prevent channeling or openings in the media, through which unfiltered air could otherwise pass. The ridges are spaced apart from each other to allow for a high degree of airflow throughout the canister 200. Further details regarding embodiments of a mask and various accompanying structures that may be fitted on the canister 200 are provided in U.S. patent publication No. 2008/0156329, entitled "Cartridge Respirator with Integral Filter Adaptor," the content of which is hereby incorporated by reference in its entirety.

Figure 4A:
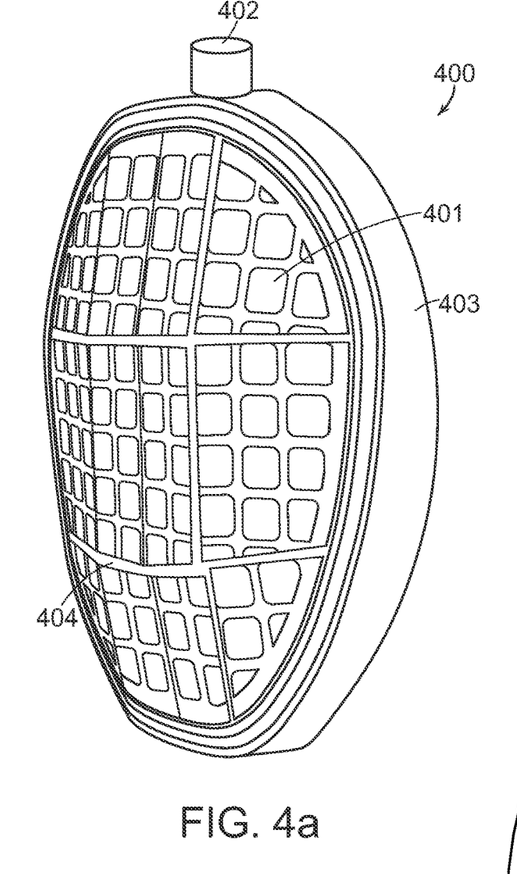
FIG. 4a is a diagram of a canister with a rounded body.

In some embodiments, a filter canister filled by the system depicted in FIG. 1 can be made to have a rounded shape, thus increasing the available volume for packing particulate material for relative to the surface area of the exterior of the filter canister. It is noted that because the packing of the particulate material is achieved through application of centrifugal forces, rather than by pressing the particular material using the walls of the filter canister, a substantially flat-shaped housing for the canister is not needed. Referring to FIG. 4a, a diagram of an example modified filter canister 400 is depicted. The modified filter canister 400 is shown to have a curved body relative to the body structure of the filter canister 200 seen in FIG. 2. The modified canister 400 includes a curved canister body 403 defining an inner cavity 401, where the curved canister body 403 is shown to include a fill opening 402 at its top. The fill opening 402 serves fundamentally the same purpose as the fill opening 202 depicted in FIG. 2. As such, the fill opening 402 is positioned such that a retractable application pipe (such as the pipe 126 seen in FIG. 1) can be inserted so as to fill the inner cavity 401 with particulate filter material. Here too, while the fill opening 402 is shown to be positioned at a top portion of the canister, the fill opening 402 may be located at other places on the exterior of the canister 400. A curved lattice 404 defines the curvature of the modified filter canister 400, as well as a series of vents through which filter air can be passed to a mask in a manner functionally similar to that which is provided by lattice 204 as depicted in FIG. 3.

Further referring to FIG. 4a, the shape of the filter canister 400 is shown to have a curvature that is defined by a curvature in the lattice 404 in addition to a curvature in the outer wall 403. The resulting overall shape for the filter canister 400 is such that, when compared to the filter canister 200 shown in FIG. 2, the two canisters have comparable height (length along the longitudinal axis extending from the canister's top to its bottom), the filter canister 400 protrudes further along a transverse axis of the canister's body. This give the filter canister 400 a greater volume than the filter canister 200 shown in FIG. 2, for a relatively small increase of materials used to create the filter canister 400. A consequence of the volume increase of the filter canister 400 relative to filter canister 200 is that more particulate filter material (shown in FIG. 4b) can be contained within the inner cavity 401 of the filter canister 400.

Figure 4B:
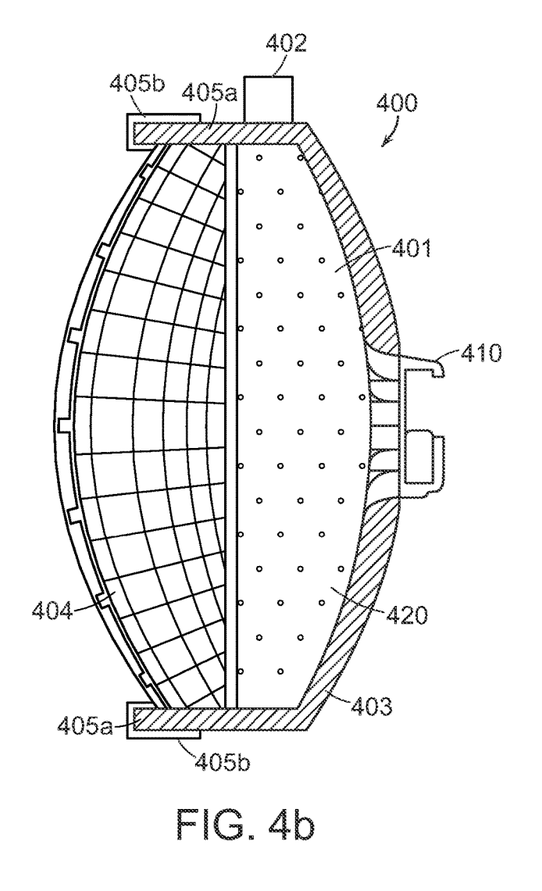

Referring to FIG. 4b, a cross-sectional view of the modified filter canister 400 shown in FIG. 4a is provided. The inner cavity 401 is shown to be the space between the outer wall 403 and the curved lattice 404. The outer wall 403 is shown to be shaped such that it fits securely into a slot 405a, where the slot 405a is formed as the interior space created by a circumferential lip 405b on the rim of the curved lattice 404. The seal formed by the outer wall 403 and the circumferential lip 405b is such that their coupling ensures that air can first flow through the lattice side of the canister body, into the inner cavity 401. In addition, a female connector 410 is affixed to the outer wall 403. The positioning of the female connector 410 in the outer wall 403 is chosen so as to facilitate air flow through the lattice 404 to an opening (not shown) created by the presence of the female connector 410 in the outer wall 403.

Alternative methods of packing particulate filter material into a filter canister include slowly dropping particulate filter material from above into one half of a filter canister, while simultaneously vibrating the one half of a filter canister as it is being filled, so as to help facilitate filter material settling in all portions of the half of a filter canister (colloquially this method is referred to as the "snow filling" technique). Once a sufficient amount of particulate filter material has been filled into the half of a filter canister, a second half of the canister is lowered onto the first half, thereby further compressing the particulate filter material now contained in the inner cavity created by the two halves.

A disadvantage of the above-described "snow filling" method is that both filter canister halves generally have to be flat and cannot be curved. This is because a curved canister housing portion would not pack the enclosed filter material as tightly as a substantially flat canister housing portion would. Thus, an advantage of using centrifugal force to pack particulate filter material, as depicted in the system of FIG. 1, is that a canister is not limited to having a flat cover. Further advantages of using a rounded filter canister such as the filter canister 400 shown in FIGS. 4a and 4b is that the filter canister's housing portions can be pre-assembled prior to filling the canister (i.e., via centrifugal force). Because the method of filling a canister with particulate filter material using centrifugal force does not require that the housing portions of the canister be open while the canister is being filled in order to achieve a particular packing density, a filter canister can both be pre-assembled and densely filled with packing material.

Figure 5:
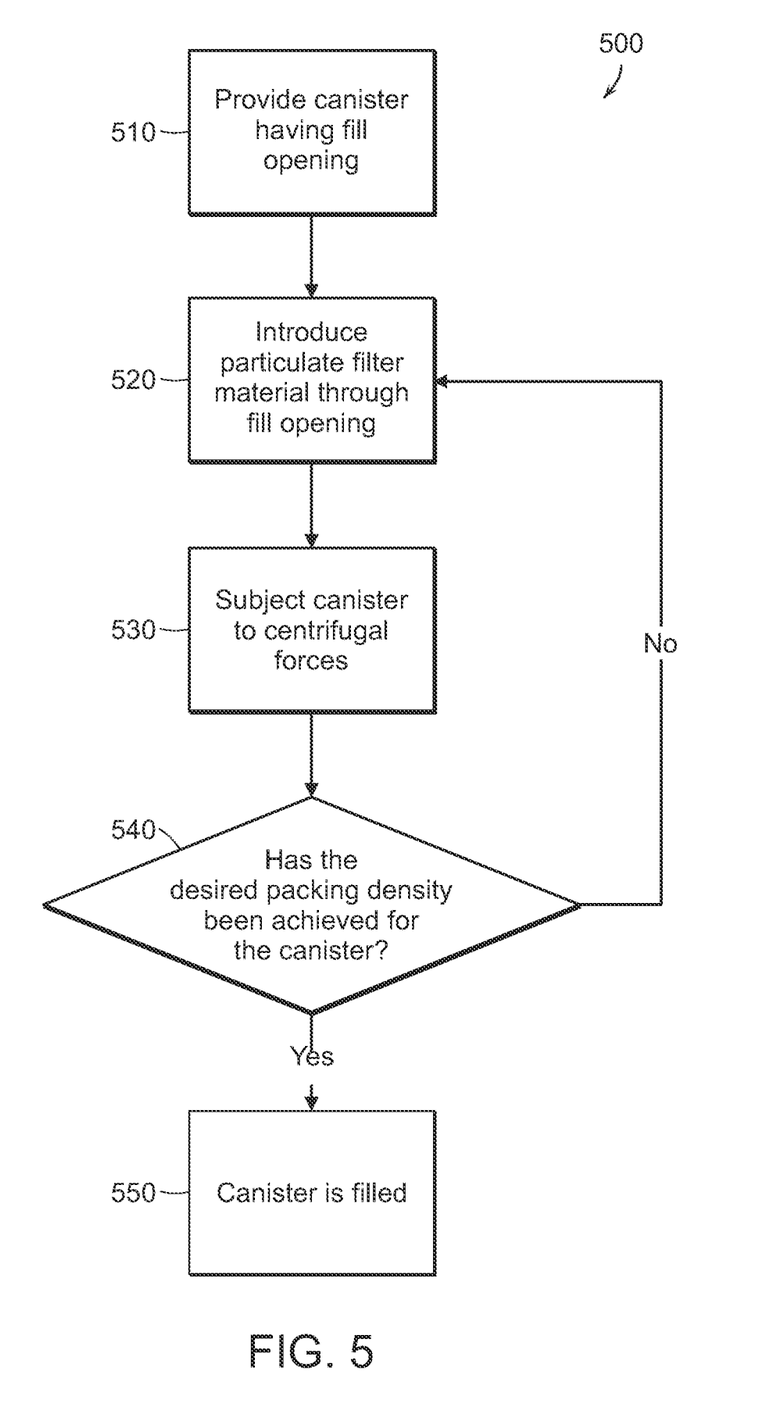
FIG. 5 is a flowchart of an example procedure to fill a respirator canister with particulate filter material.

Referring to FIG. 5, a flowchart of an example procedure 500 to fill an empty canister with particulate filter material at a desired packing density is shown. The procedure 500 begins by providing 510 a canister having a fill opening at its top. Once provided, the canister is filled (at 520) with particulate filter material through its fill opening (such as the fill opening 202 shown in FIG. 2). As discussed above, the canister may be filled using a retractable application pipe connected to a reservoir of particulate filter material. After introducing a certain amount of particulate filter material to the canister, the canister is subjected to centrifugal forces (530) for a predetermined duration. The amount of particulate filter material introduced to the canister before the canister is subjected to centrifugal forces may vary between embodiments; in some embodiments, the particulate filter material may be monitored by mass or weight, and after a certain mass or weight has been transferred to the canister, the canister ceases to fill. In other embodiments, the canister could be filled with particulate filter material for a certain amount of time before filling ceases and the canister is subjected to centrifugal forces. In even further embodiments, the operations of 520 and 530 may be concurrent, where particulate filter material is introduced to the canister while the canister is being subjected to centrifugal forces.

Further referring to FIG. 5, once the canister has been both subjected to some amount of centrifugal force and filled with some amount of particulate filter material, the canister may be checked for a predetermined density of particulate filter material. If the canister contains particulate filter material at a desired density, then the canister has been filled and the process ends (corresponding to the operations at 540 transitioning to the operations at 550). If the canister does not contain the particulate filter material at a desired density, then it is necessary to continue filling the canister with particulate filter material and further subject the canister to centrifugal forces (corresponding to the operations at 540 transitioning to the operations at 520).

In some embodiments, additional operations may be added to the procedure 500 of FIG. 5. For example, at some point prior to the operations at 530, further processing may include choosing to position (e.g., via a grasping arm or other mechanism to control the orientation of the canister so as to facilitate, for example, the distribution of particulate material through application of centrifugal forces) the canister in a horizontal position. Similarly, at some point prior to 530, further processing may include positioning the canister in a vertical position. In another example, at some point prior to performing the operations at 530, the canister may be placed in a horizontal position, and subsequently, while subjecting the canister to centrifugal forces, the canister may be moved from the horizontal position to the vertical position. In yet another example, the procedure may include moving the canister from the horizontal position to the vertical position, repeatedly. The motivation for any of the previously discussed additional operations could be that said positioning, in either of two (or more) orientations, and/or a subsequent moving between the two (or more) orientations, may result in a more efficient packing of particulate filter material.

Further referring to FIG. 5, in some embodiments, the procedure 500 may include choosing to perform various operations either at the same time or at separate times. For example, one alternative embodiment may include performing the introducing operations at 520 and the subjecting operations at 530 sequentially. In another alternative embodiment, the introducing operations at 520 may be performed with the subjecting operations at 530 occurring substantially simultaneously.

Further referring to FIG. 5, the operations for determining density of particulate filter material within a canister (e.g., at 540) may be performed in various ways. In one embodiment, the density may be determined by estimating the density, based upon a known amount of particulate filter material provided to the canister, a known duration of applying centrifugal force to the canister, and a known magnitude of the centrifugal force applied to the canister at a given time. In some embodiments, the check described at 540 may be implemented in software as a "while" loop, where the condition for exiting the loop is achieving a desired packing density for the canister.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method of filling a filter canister with a particulate filter material to a desired packing density, the method comprising:
   providing a canister having a fill opening through which the particulate filter material is introduced into the canister, wherein the particulate filter material is introduced through the fill opening from an end of the retractable application pipe;
   introducing the particulate filter material through the fill opening; and
   rotating the cannister using a rotation mechanism so as to subject the canister to centrifugal forces for a time until the desired packing density is reached, wherein the retractable application pipe is coupled to the rotation mechanism and the rotation mechanism is configured to actuate the retractable application pipe to cause the retractable application pipe to rotate.

2. The method of claim 1 wherein, prior to subjecting the canister to centrifugal forces, positioning the canister in a horizontal position.

3. The method of claim 1 wherein, prior to subjecting the canister to centrifugal forces, positioning the canister in a vertical position.

4. The method of claim 1 wherein, during the subjecting of the cannister to centrifugal forces, the canister is moved from a horizontal position to a vertical position, repeatedly.

5. The method of claim 1, wherein the filter cannister has a curved peripheral outer wall and the fill opening is in the peripheral outer wall, wherein the canister is further defined by an inlet wall that is convex, and the inlet wall and the outlet wall are spaced from each other and joined by the peripheral outer wall.

6. The method of claim 1 wherein the particulate material is mixed with heterophil fibers.

7. A canister filling system, the system comprising:
   a reservoir containing particulate filter material;
   a retractable application pipe coupled to the reservoir and configured to transfer the particulate filter material from an end of the application pipe coupled to the reservoir to another end of the application pipe; and
   a rotation system to hold a filter canister with a fill opening couplable to the other end of the application pipe, the rotation system configured to rotate the filter canister so as to generate centrifugal forces applied to the filter canister for a period of time until a desired packing density of the particulate material, introducible into the filter canister through the fill opening, is reached, wherein the rotation system comprises the retractable application pipe coupled to a rotation mechanism configured to actuate the retractable application pipe to cause the retractable application pipe to rotate.

8. The system of claim 7, wherein the reservoir comprises a hopper with an inwardly tapered end section defining a hopper outlet opening coupled to the retractable application pipe.

9. The system of claim 7 wherein the rotation system comprises a rotating platform.

10. The system of claim 7 wherein the retractable application pipe is configured to lock into the filter canister during rotation of the retractable application pipe.

11. The system of claim 7 wherein the rotation system comprises a rotating disk securable to the filter canister.

12. The system of claim 7, further comprising a controllable motor to controllably cause retraction or extension of the retractable application pipe.

13. The system of claim 12, wherein the motor is controlled by a controller to determine the retraction or extension of the retractable application pipe based on data produced by the rotation system.

14. The system of claim 13 wherein the data comprises measured angular velocity of the rotation system.

15. The system of claim 7, further comprising a valve placed inside the retractable application pipe to control flow of the particulate material introducible into the filter canister.

16. The system of claim 15, further comprising a controller to controllably actuate opening position of the valve.

17. The system of claim 7 wherein the particulate filter material is selected from the group of activated charcoals, zeolites, molecular sieves and alumina.

18. The system of claim 7, wherein the rotation system comprises a rotating holding mechanism configured to hold the canister and displace the canister in multiple directions.

* * * * *